United States Patent [19]

Akiyama et al.

[11] Patent Number: 4,745,141

[45] Date of Patent: May 17, 1988

[54] UNSATURATED POLYESTER RESIN COATING COMPOSITION

[75] Inventors: Mamoru Akiyama, Ibaraki; Sadao Shigematsu, Amagasaki; Akira Matsumura, Suita, all of Japan

[73] Assignee: Nippon Gohsei Kagaku Kogyo Kabushiki Kaisha, Osaka, Japan

[21] Appl. No.: 2,284

[22] Filed: Jan. 12, 1987

Related U.S. Application Data

[63] Continuation-in-part of Ser. No. 759,959, Jul. 29, 1985, abandoned.

[30] Foreign Application Priority Data

Aug. 3, 1984 [JP] Japan .................................. 59-164024

[51] Int. Cl.$^4$ ............................................. C08L 67/06
[52] U.S. Cl. ..................................... 523/500; 525/42; 525/445
[58] Field of Search .................. 525/42, 445; 523/500

[56] References Cited

U.S. PATENT DOCUMENTS

| | | | |
|---|---|---|---|
| 4,163,093 | 7/1979 | Hess | 528/301 |
| 4,228,251 | 10/1980 | Mackawa | 525/42 |
| 4,233,413 | 11/1980 | Monma | 525/168 |
| 4,274,992 | 6/1981 | Buechler | 525/42 |
| 4,304,883 | 12/1981 | Fujii | 525/170 |

FOREIGN PATENT DOCUMENTS

| | | |
|---|---|---|
| 58-108218 | 6/1983 | Japan . |
| 810222 | 3/1959 | United Kingdom . |

*Primary Examiner*—Patricia A. Short
*Attorney, Agent, or Firm*—Antonelli, Terry & Wands

[57] ABSTRACT

An unsaturated polyester resin coating composition comprises (A) 10 to 45 parts by weight of air dryable unsaturated polyester resin comprising a polybasic acid and a polyhydric alcohol, (B) 50 to 70 parts by weight of a filler and (C) 5 to 50 parts by weight of a vinyl monomer, the total amount of the components (A), (B) and (C) being 100 parts by weight; said unsaturated polyester resin (A) having (1) 10 to 50% of units of at least one member selected from the group consisting of cyclopentadiene and dicyclopentadiene and (2) 2 to 40% by units of an acyclic ether having allyl group and hydroxyl group, said % being % by mole based on said polybasic acid. The composition has an improved drying property and provides a coating film having an improved adhesion property to substrates, particularly in the wet state, and also to top coats, and having improved gloss and sharpness, and is particularly useful as a putty.

4 Claims, No Drawings

UNSATURATED POLYESTER RESIN COATING COMPOSITION

CROSS-REFERENCE TO RELATED APPLICATION

This is a continuation-in-part of application Ser. No. 759,959 filed on July 29, 1985, now abandoned.

BACKGROUND OF THE INVENTION

The present invention relates to an unsaturated polyester resin composition useful as general paints, and more particularly to an unsaturated polyester resin coating composition useful as putty for repairing of cars, and as sealing material for joint sections of buildings, sashes or insertion section of glass, as well as paints.

An unsaturated polyester resin prepared by reacting an unsaturated polybasic acid, a saturated polybasic acid and a polyhydric alcohol has been widely employed as paints, adhesives, moldings, and the like. However, practically, only these polybasic acids and polyhydric alcohol has scarcely been used in producing of the unsaturated polyester resin. That is, modifying components such as cyclopentadienes or dicyclopentadienes are introduced into the above unsaturated polyester resin for improving the shrinkage property or water-resistance, or a polyhydric alcohol allyl ether is introduced into the unsaturated polyester resin for giving the air drying property to the unsaturated polyester resin.

Paints prepared from such a polyester resin have some advantages such as excellent gloss and beautiful finishing. However, the paints are required to have higher functions, because the paints are generally employed out of doors.

The above unsaturated polyester resin has been known as materials for general paints, but a satisfactory unsaturated polyester resin suitable for putty use which particularly requires strict properties, has not been prepared. That is to say, a composition prepared by admixing a filler and a vinyl monomer with the abovementioned unsaturated polyester resin, particularly the unsaturated polyester resin to which a polyhydric alcohol allyl ether component is introduced, has hitherto been employed as putty, and proper contrivances such as controling of a mixing ratio of the components have been made in order to employ the unsaturated polyester resin as putty. However, there is room for improvement, because the unsaturated polyester resin employed for general paints is only used for putty. That is to say, the above unsaturated polyester resin has the following problems to be solved.

(1) It is necessary to increase an adhesion property, particularly an adhesion property in the wet state (hereinafter referred to as "wet adhesive strength") of unsaturated polyester resin, to substrates, particularly to metals.

(2) It is necessary to give an extremely quick drying property to the unsaturated polyester resin.

(3) In case of a putty used for repairing cars, it is further required to increase the adhesion property to top coats in addition to the requirements (1) and (2). It is also necessary that the good gloss and sharpness of the coating surface are maintained for a long term, even if the coatings are exposed to severe conditions of temperature and humidity of the open air, and that the coatings have such heat-resistance that even if the coatiangs are exposed to high temperature, for instance, around an engine, the surface properties of the coatings are not lowered.

An object of the present invention is to provide an unsaturated polyester resin coating composition which can solve the above problems.

This and other objects of the present invention will become apparent from the description hereinafter.

SUMMARY OF THE INVENTION

In accordance with the present invention, there is provided an unsaturated polyester resin coating composition comprising (A) 10 to 45 parts by weight of an air dryable unsaturated polyester resin comprising a polybasic acid and a polyhydric alcohol, (B) 50 to 70 parts by weight of a filler and (C) 5 to 50 parts by weight of a vinyl monomer, the total amount of said components (A), (B) and (C) being 100 parts by weight; said unsaturated polyester resin (A) having (1) 10 to 50% of units of at least one member selected from the group consisting of cyclopentadiene and dicyclopentadiene and (2) 2 to 40% of units of an acyclic ether having allyl group and hydroxyl group, said % being % by mole based on said polybasic acid.

DETAILED DESCRIPTION

In the invention, it is necessary to introduce both the cyclopentadiene and/or dicyclopentadine units (hereinafter referred to as "(di)cyclopentadiene units") and the acyclic ether units having allyl group and hydroxyl group (hereinafter referred to as "acyclic ether units") into the unsaturated polyester resin. There is obtained a synergistic effect which is unexpected from the single use of each of them. Particularly, in the invention, the wet adhesive strength to metal, quick drying property and adhesion property to top coats, which are necessary for use as the putty, are extremely increased.

It is a surprising fact that the acyclic ether units which have been conventionally introduced into the unsaturated polyester resin for giving only the air drying property, contributes to improvements in the above properties when introduced together with the (di)cyclopentadiene units. It is essential to introduce the above 2 kinds of modifying components into the unsaturated polyester resin. It is hard to obtain a remarkable effect by only admixing an unsaturated polyester resin containing the (di)cyclopentadiene units and an unsaturated polyester resin containing the acyclic ether units. Also, even if tricycloalkanes having a structure resembling (di)cyclopentadiene are employed, it is hard to obtain an effect as produced by the invention and the unsaturated polyester resin containing tricycloalkans is required to have more practical and excellent properties.

The introduction of the (di)cyclopentadiene units into the unsaturated polyester resin is fundamentally achieved by employing a mixture of at least one of cyclopentadiene, dicyclopentadiene and derivatives thereof, a polybasic acid, a polyhydric alcohol and an acyclic ether in the condensation reaction. The (di)cyclopentadiene units may present at the ends of or in the main chain of the unsaturated polyester resin.

Examples of the derivatives of the (di)cyclopentadiene are, for instance, tricyclodecenyl maleate, tricyclodecenyl fumarate, tricyclodecenyl adipate, tricyclodecenyl phthalate, tricyclodecenyl isophthalate, tricyclodecenyl trimellitate, ethyleneglycol tricyclodecenyl ether, diethyleneglycol tricyclodecenyl ether, propyleneglycol tricyclodecenyl ether, 1,4-butanediol tricyclodecenyl ether, 1,6-hexanediol tricyclodecenyl ether, neopentylglycol tricyclodecenyl ether, glycerol tricyclodecenyl ether, trimethylolpropane tricyclodecenyl ether, hydroxylated dicyclopentadiene, and the like.

It is necessary that the content of the (di)cyclopentadiene units in the unsaturated polyester resin (A) is from 10 to 50% by mole, preferably from 20 to 40% by mole, based on the polybasic acid in the unsaturated polyester resin (A). When the content is less than 10% by mole, the desired water-resistance is not satisfactorily obtained, and when the content is more than 50% by mole, no practical paints are obtained, because the drying property is lowered.

The acyclic ether is prepared by reaction of polyhydrics alcohol with allyl halide and contains allyl group and hydroxyl group in the molecule.

Examples of the acyclic ether used for introducing the units thereof with the (di)cyclopentadiene units into the unsaturated polyester resin are, for instance, pentaerythritol triallyl ether, trimethylolpropane diallyl ether, glycerol monoallyl ether, trimethylolethane diallyl ether, glycerol diallyl ether, and the like. The acyclic ethers used in the invention have at least one hydroxyl group, and allyl group in its molecule.

The content of acyclic ether units is from 2 to 40% by mole, preferably 10 to 30% by mole, based on the polybasic acid in the unsaturated polyester resin (A). When the content is less than 2% by mole, the synergistic effect with respect to the water resistance is not obtained, and the air dryablility is also lowered. On the other hand, even if the ether units are introduced in an amount of more than 40% by mole, no remarkable improvements in the properties corresponding to the increase in its content are observed.

In the preparation of the unsaturated polyester resin (A), unsaturated polybasic acids are generally employed as the polybasic acid, and saturated polybasic acids may be employed with the unsaturated polybasic acids, as occasion demands.

Examples of the unsaturated polybasic acid are, for instance, maleic anhydride, maleic acid, fumaric acid, itaconic anhydride, itaconic acid, and the like. Examples of the saturated polybasic acid are, for instance, phthalic anhydride, phthalic acid, terephthalic acid, isophthalic acid, chlorendic anhydride, adipic acid, tetrahydrophthalic anhydride, trimellitic acid, trimellitic anhydride, pyromellitic acid, pyromellitic anhydride, 4-methylcyclo-hexene-1,2,3-tricarboxylic anhydride, cis-3-methyl-4-cyclohexene-cis, cis-1,2-dicarbonic anhydride, trimesic acid, and the like. The polybasic acids may be employed alone or in admixture thereof.

Examples of the polyhydric alcohol to be condensed with the above-mentioned polybasic acid are, for instance, ethylene glycol, propylene glycol, diethylene glycol, triethylene glycol, dipropylene glycol, bisphenoldioxy propyl ether, 1,3-butylene glycol, 2,3-butylene glycol, neopentyl glycol, trimethylol propane, trimethylol ethane, pentaerythritol, glycerol, and the like. The polyhydric alcohols may be employed alone or in admixture thereof.

The coating composition of the invention is prepared by admixing the unsaturated polyester resin (A), fillers (B) and vinyl monomers (C) in the total amount of the components (A), (B) and (c) of 100 parts by weight.

Examples of the filler (B) are, for instance, calcium carbonate, clay, talc, mica, asbestos powder, pulverized silica, barium sulfate, zinc stearate, lithopone, titanium white, cyanine blue, chrome yellow, Watchung Red, red iron oxide, carbon black, aniline black, and the like. The fillers may be employed alone or in admixture thereof.

Any known cross-linking monomer employed in unsaturated polyester resin can be employed as the vinyl monomers (C). Representative examples of the vinyl monomer (C) are, for instance, styrene, vinyl toluene, monochlorostyrene, diallyl phthalate, methyl methacrylate, methyl acrylate, vinyl acetate, glycidyl methacrylate, and the like. The vinyl monomers may be employed alone or in admixture thereof.

The unsaturated polyester resin (A), filler (B) and vinyl monomer (C) are admixed in a proportion such that the amounts of unsaturated polyester resin, filler and vinyl monomer are 10 to 45 parts by weight, 50 to 70 parts by weight and 5 to 50 parts by weight, respectively, the total amount of the components (A), (B) and (C) being 100 parts by weight. When the amount of the unsaturated polyester resin (A) is less than 10 parts by weight, the curing property and wet adhesive strength are lowered. When the amount of the component (A) is more than 45 parts by weight, the workability is lowerd because of increase in the viscosity of the composition. When the amount of the fillers (B) is less than 50 parts by weight, the wet adhesive strength is lowered and when the amount of the component (B) is more than 70 parts by weight, the workability is lowered. When the amount of the vinyl monomer (C) is less than 5 parts by weight, the curing property and the workability are lowered and when the amount of the component (C) is more than 50 parts by weight, the coatings are not practical because of poor wet adhesive strength.

The coating composition of the invention may contain usual additives, e.g. curing agent, curing accelerator, diluent, thermoplastic resin, other additives used for coating compositions, as occasion demands.

Examples of the curing agent are, for instance, methyl ethyl ketone peroxide, cyclohexanone peroxide, benzoyl peroxide, dicumyl peroxide,, t-butyl perbenzoate and the like.

Examples of the curing accelerator are, for instance, metal soaps such as cobalt octenate, cobalt naphthenate and manganese naphthenate, tertiary amines, and the like.

Examples of the diluent are, for instance, ethyl acetate, toluene, xylene, methanol, ethanol, butanol, acetone, methyl isobutyl ketone, methyl ethyl ketone, cellosolve, diacetone alcohol, and the like.

Examples of the thermoplastic resin are, for instance, cellulose acetate butyrate, nitrocellulose, vinyl chloride resin, vinyl acetate resin, acrylate resin, copolymer of acrylate resin, butylated melamine resin, butylated urea resin, and the like.

Examples of the other additives are, for instance, phosphoric acid, tartaric acid, phosphorous acid, fats and oils, silicone oil, surface active agents, paraffin wax, and the like.

The coating composition of the present invention is particularly useful as putty for repairing of cars or car sheet metals, as primer for steel furnitures or as sealing materials for use in joint sections of buildings, sashes or insertions of glass. It can of course be employed as the paints for general wood processing, etc. Any coating methods can be employed, for instance, spraying, knifing, brushing and the like.

When cars are repaired by employing the compostion of the invention, top coats can be further overcoated on the paint of the invention. As the above-mentioned top coats, conventional colored paints or metallic paints such as acrylurethane resin, acrylalkyd nitrocellulose resin, acrylcellulose, acetate butyrate resin can be employed.

In case of repairing cars, the composition of the invention is first applied to coating defects or scaling on a coated car-body or dents of steel plates. After drying the coating film, the coating surface is polished, a primer is then coated thereon and finally it is coated with a top coat. The repair paint according to the present invention and the primer may be repeatedly applied two or more times, as occasion demands. In case that the size of dents to be repaired is large, the dent portion in a steel plate is suitably made small by beating or tension.

The present invention is more specifically described and explained by means of the following Examples, in which all parts and % are by weight unless otherwise noted. It is to be understood that the present invention is not limited to Examples, and various changes and modifications may be made in the invention without departing from the spirit and scope thereof.

EXAMPLE 1

A 2 liter flask equipped with a stirrer and a reflux condenser was charged with 0.60 mole of maleic anhydride, 0.4 mole of tetrahydrophthalic anhydride, 0.30 mole of diethylene glycol, 0.55 mole of triethylene glycol, 0.30 mole of dicyclopentadiene, 0.10 mole of pentaerythritol triallyl ether, 0.02 % of, based on the total amount of the above starting materials, hydroquinone, and 3.0% of xylene solvent to the starting materials. The mixture was subjected to esterification at a temperature of 150° to 195° C. for 3 hours and further at 195° C. for 3 hours. After the completion of the esterification reaction, xylene was distilled away from the reaction mixture at 150° C. for 1 hour to give an unsaturated polyester resin having an acid value of 12 KOH mg/g.

The obtained resin was diluted with styrene to give a resin solution having a solid concentration of 65% and a viscosity of 1,050 cps (20° C.).

The viscosity was measured by a BH type rotation viscometer at 6 rpm in the number of rotation of rotor (No. 7).

A putty for repairing car was prepared by adding 20 g of styrene, 300 g of talc, 60 g of titanium oxide and 6 g of cobalt octenate (cobalt content: 8%) to 320 g of the obtained resin solution and kneading the mixture. To the putty was added 2.0% of cyclohexanone peroxide (commercially available under the commercial name "CYPOX PL", made by Kawaguchi Yakuhin Kabushiki Kaisha), and the putty was coated on a cold rolled carbon steel sheet by knifing.

The drying property, water resistance and adhesion property to metals of the obtained coating films (thickness: 0.5 mm) were examined. The water resistance was estimated by blister resistance, namely the presence or absence of blister of the test specimens subjected to for 24 hours, 48 hours or 96 hours. The adhesion property to metal was judged by a tensile strength measured according to the plane tensile testing method for special plywood provided by Japanese Agriculture and Forestry Standard (JAS).

The results are shown in Table 1.

COMPARATIVE EXAMPLE 1

The procedure of Example 1 was repeated except that dicyclopentadiene was not employed, to give a styrene solution of a polyester resin having an acid value of 17 KOH mg/g (viscosity: 1,200 cps at 20° C., solid concentration: 65%).

The results are shown in Table 1.

COMPARATIVE EXAMPLE 2

The procedure of Example 1 was repeated except that pentaerythritol triallyl ether was not employed, to give a styrene solution of a polyester resin having an acid value of 15 KOH mg/g (viscosity: 1,150 cps at 20° C., solid concentration: 65%).

The results are shown in Table 1.

COMPARATIVE EXAMPLE 3

A resin solution was prepared by admixing equal amounts of the resin solutions prepared in Comparative Examples 1 and 2.

The results are shown in Table 1.

COMPARATIVE EXAMPLE 4

The procedure of Example 1 was repeated except that tricyclodecane dimethylol was employed instead of dicyclopentadiene, to give a solution of a polyester resin having an acid value of 20 KOH mg/g (viscosity: 1,300 cps at 20° C., solid concentration: 65%).

The results are shown in Table 1.

TABLE 1

| | Salt spraying (hours) | Properties of the film | | Drying property |
| --- | --- | --- | --- | --- |
| | | Test | | |
| | | Blister[1] resistance | Adhesion property to metal (kg/cm$^2$) | |
| Ex. 1 | 24 | 10 | 5.2 | Sanding was |
| | 48 | 10 | 4.8 | possible after |
| | 96 | 10 | 3.7 | 30 minutes |
| Com. Ex. 1 | 24 | 6M | 2.1 | Sanding was |
| | 48 | 4MD | 1.2 | possible after |
| | 96 | 2D | 0.8 | 50 minutes |
| Com. Ex. 2 | 24 | 8F | 4.5 | Sanding was |
| | 48 | 6M | 1.5 | impossible |
| | 96 | 4D | 0.9 | even after one day |
| Com. Ex. 3 | 24 | 6M | 1.7 | Sanding was |
| | 48 | 4MD | 1.0 | possible |
| | 96 | 2D | 0.6 | after 4 hours |
| Com. Ex. 4 | 24 | 8MD | 4.1 | Sanding was |
| | 48 | 6MD | 1.4 | impossible |
| | 96 | 4D | 0.8 | after one day |

(Note):
[1]The blister resistance was measured according to American Society for Testing Materials (ASTM) D 714-56 and estimated according to the following criteria.

| Size of blister (mm) | | Frequency of blister | |
| --- | --- | --- | --- |
| 10 | No blister | F | Few |
| 8 | Not more than 1 | M | Medium |
| 6 | 1 to 2.5 | MD | Medium dence |
| 4 | 2.5 to 5.4 | D | Dence |
| 2 | Not less than 5.4 | | |

EXAMPLES 2 and 3

The procedure of Example 1 was repeated except that an unsaturated polyester resin was prepared employing the ingredients shown in Table 2.

The results are shown in Table 2.

EXAMPLE 4

The procedure of Example 1 was repeated except that the unsaturated polyester resin was prepared as follows:

The same flask as in Example 1 was charged with 0.45 mole of maleic anhydride, 0.40 mole of tetrahydrophthalic anhydride, 0.30 mole of ethylene glycol and 0.70 mole of triethylene glycol. The reaction was conducted at 220° C. for 4 hours. To the mixture was added 0.30 mole of hydroxylated dicyclopentadiene and 0.20 mole of trimethylolpropane diallyl ether at the time when the acid value of the mixture became 30 KOH mg/g and the viscosity of the mixture become 1,100 cps, and the reaction was further conducted at 200° C. for 6 hours. The final unsaturated polyester resin had an acid value of 14 KOH mg/g and a viscosity of 1,100 cps. The obtained resin was diluted with styrene to give a resin solution having a solid concentration of 65%.

The results are shown in Table 2.

EXAMPLES 7 to 12

Preparation of test plate

Steel plate (30 cm×30 cm) was degreased by electrolysis and surface-treated with zinc phosphate. After applying a maleinized polybutadiene electrode-position coating to the treated plate, the plate was cured by backing. The plate was overcoated with an intermediate coat of melamine alkyd resin, and it was then overcoated with a top coat. It was finished in the same manner as in coating of car-body. The obtained panel was caused a pitting (diameter: 1 cm, depth: 2 mm) by press forming.

Repairing

The putty prepared in Examples 1 to 6 was coated on and around the pitting formed on the test plate so that the thickness of the coating film was 2.5 mm. After drying, the putty was ground by sanding to make the surface smooth.

TABLE 2

|  | Composition of polyester resin (mole) | | | | | Properties of the film | | | |
|---|---|---|---|---|---|---|---|---|---|
|  |  |  |  |  |  |  | Test | | |
|  | Unsaturated acid | Saturated acid | Polyhydric alcohol | (Di)cyclo-pentadien | Acyclic ether | Salt spraying (hours) | Blister resistance | Adhesion property to metal (kg/cm²) | Drying property |
| Ex. 2 | MAn 0.45 | THPAn 0.40 | EG 0.30 TEG 0.70 | M-DCPD 0.30 | TMP-DA 0.20 | 24 48 96 | 10 10 10 | 5.4 5.0 4.2 | Sanding was possible after 35 minutes |
| Ex. 3 | MAn 0.60 | THPAn 0.40 | EG 0.15 TEG 0.70 | E-DCPD 0.30 | PE-DA 0.20 | 24 48 96 | 10 10 8F | 5.2 4.8 4.1 | Sanding was possible after 20 minutes |
| Ex. 4 | MAn 0.60 | THPAn 0.40 | EG 0.15 TEG 0.70 | H-DCPD 0.30 | GL-MA 0.20 | 24 48 96 | 10 10 8F | 5.0 4.7 4.0 | Sanding was possible after 50 minutes |

(Note):
MAn: Maleic anhydride
THPAn: Tetrahydro phthalic anhydride
EG: Ethylene glycol
DEG: Diethylene glycol
TEG: Triethylene glycol
DCPE: Dicyclo pentadiene
M-DCPD: Tricyclodecenyl maleate
E-DCPD: Ethylene glycol tricyclodecenyl ether
H-DCPD: Hydroxylated dicyclopentadiene
PE-TA: Pentaerythritol triallyl ether
TMP-DA: Trimethylolpropane diallyl ether
GL-MA: Glycerine monoallyl ether

EXAMPLES 5 and 6

The procedure of Example 1 was repeated except that the unsaturated polyester resin, filler and styrene were admixed in amounts as shown in Table 3.

The results are shown in Table 3.

The appearance of the film was observed and a cross-cut-test was carried out.

The results are shown in Table 4.

Then, a white melamine alkyd resin paint was coated on the test plate by employing an air-spray so that the thickness of the dry film was 60 to 100μ. The coated plate was heat-cured by an infrared lamp.

TABLE 3

|  | Composition of paint (g) | | | | | | | Properties of the film | | | |
|---|---|---|---|---|---|---|---|---|---|---|---|
|  | Unsaturated polyester resin | | Filler | | Vinyl monomers | | Viscosity of paint (cps) | Salt spraying (hours) | Test | | |
|  | Resin prepared in Ex. 1 | Resin prepared in Ex. 2 | Talc | Titanium oxide | Styrene | Total |  |  | Blister resistance | Adhesion property to metal (kg/cm²) | Drying property |
| Ex. 5 | 320 (Net: 240) | — | 300 | 60 | 20 | 100 | 8,000 | 24 48 96 | 10 10 10 | 5.0 4.7 4.0 | Sanding was possible after 40 minutes |
| Ex. 6 | — | 280 (Net: 210) | 500 | 165 | 55 | 125 | 15,000 | 24 48 96 | 10 10 8F | 4.8 4.2 4.0 | Sanding was possible after 60 minutes |

The glossiness, sharpness and adhesion property of the obtained films were measured.

The results are shown in Table 4.

COMPARATIVE EXAMPLES 5 to 8

The procedure of Examples 7 to 12 was repeated except that the putty prepared in Comparative Examples 1 to 4 were employed.

The results are shown in Table 4.

(1) Appearance of film

It was judged with the nacked eye that the film was smooth or not, and pinholes or sags existed or not on the film.

(2) Cross-cut-test

The film was cut by a cutter to form 100 squares each having a size 1×1 mm and the procedure of adhesion-peeling off of adhesive tape is carried out. The number of remaining squares are shown.

(3) Glossiness

The test plate was exposed to rain of 12 minutes and then infrared irradiation of 48 minutes at 50° C. in a sunshine-weather tester. The above treatment was repeated 500 times. Then 60° relative-specular glossiness of the treated plate was measured.

(4) Sharpness

The test plate was kept at −20° C. for 16 hours, and then at 80° C. for 8 hours. The above treatment was repeated 30 times. Then, a disorder of reflex of fluorescent lamp on the surface of film was obserbed with the necked eye.

(5) Adhesion property in the hot wet state

The test plate was heated at 160° C. for 1 hour, and then was rapidly cooled in water. The strength was measured according to the plane tensile testing method for special plywood in JAS.

TABLE 4

| | Putty | Appearance of film[1] | Cross-cut-test | Glossiness (%) | Sharpness[2] | Adhesion property in the hot wet state (kg/cm²) |
|---|---|---|---|---|---|---|
| Ex. 7 | Putty prepared in Ex. 1 | ◉ | 100/100 | 98 | ◉ | 4.8 |
| Ex. 8 | Putty prepared in Ex. 2 | ◉ | 100/100 | 99 | ◉ | 5.0 |
| Ex. 9 | Putty prepared in Ex. 3 | ◉ | 98/100 | 97 | ◉ | 4.4 |
| Ex. 10 | Putty prepared in Ex. 4 | ◉ | 96/100 | 96 | ◉ | 4.6 |
| Ex. 11 | Putty prepared in Ex. 5 | ◉ | 100/100 | 99 | ◉ | 4.7 |
| Ex. 12 | Putty prepared in Ex. 6 | ◉ | 96/100 | 96 | ◉ | 4.3 |
| Com. Ex. 5 | Putty prepared in Com. Ex. 1 | ○ | 60/100 | 80 | △ | 1.2 |
| Com. Ex. 6 | Putty prepared in Com. Ex. 2 | × | 20/100 | 65 | × | 0.9 |
| Com. Ex. 7 | Putty prepared in Com. Ex. 3 | △ | 40/100 | 75 | × | 1.0 |
| Com. Ex. 8 | Putty prepared in Com. Ex. 4 | × | 10/100 | 50 | × | 0.8 |

(Notes)

[1] The appearance of film was estimated according to the following criteria.

| Smoothness | Number of pinhols in 10 × 10 cm² |
|---|---|
| ◉ good | 0 to 5 |
| ○ Unevenness exists partly on the film surface | 6 to 10 |
| △ Slight unevenness exists on the whole film surface | 11 to 20 |
| × Noticeable unevenness exists on the whole film surface | at least 20 |

[2] The Sharpness was estimated according to the following criteria.
◉ Reflex is not disordered on the film surface
△ Reflex is disordered slightly on the film surface
× Reflex is disordered remarkably on the film surface

EXAMPLE 13

The procedure of Example 1 was repeated except that cyclopentadiene was used instead of dicyclopentadiene.

The results are shown in Table 5.

COMPARATIVE EXAMPLES 9 to 14

The procedure of Example 1 was repeated except that the unsaturated polyester resin, filler and styrene were employed in amounts shown in Table 5.

The results are shown in Table 5.

TABLE 5

| | Coating composition (part) | | | Property of putty | | Properties of the film | | | |
|---|---|---|---|---|---|---|---|---|---|
| | (A) Unsaturated polyester | (B) Filler | (C) Styrene | Viscosity (20° C.)[1] (× 10³) cps | Workability[2] | Salt spraying (hours) | Blister resistance | Adhesion property to metal (kg/cm²) | Drying property |
| Ex. 13 | 30 | 51 | 19 | 980 | Good | 24 | 10 | 5.1 | Sanding was possible after 30 minutes |
| | | | | | | 48 | 10 | 4.7 | |
| | | | | | | 96 | 10 | 3.8 | |
| Com. Ex. 9 | 5 | 60 | 35 | 850 | Good | 24 | 4D | 5.0 | Sanding was possible after 1.5 hours |
| | | | | | | 48 | 2D | 4.8 | |

TABLE 5-continued

| | Coating composition (part) | | | Property of putty | | Properties of the film | | | |
|---|---|---|---|---|---|---|---|---|---|
| | (A) Un- | | | Viscosity | | Salt | Test | | |
| | saturated polyester | (B) Filler | (C) Styrene | (20° C.)$^{(1)}$ ($\times 10^3$) cps | Workability$^{(2)}$ | spraying (hours) | Blister resistance | Adhesion property to metal (kg/cm$^2$) | Drying property |
| Com. Ex. 10 | 42 | 55 | 3 | 3500 | Bad | 24 | 10 | 5.1 | Sanding was possible after 40 minutes |
| | | | | | | 48 | 10 | 4.5 | |
| | | | | | | 96 | 8M | 3.5 | |
| Com. Ex. 11 | 30 | 45 | 25 | 750 | Good | 24 | 4D | 2.5 | Sanding was possible after 40 minutes |
| | | | | | | 48 | 2D | 1.5 | |
| | | | | | | 96 | 2D | Not more than 1 | |
| Com. Ex. 12 | 15 | 75 | 10 | 5050 | Bad | 24 | 8MD | 5.6 | Sanding was possible after 30 minutes |
| | | | | | | 48 | 8MD | 4.8 | |
| | | | | | | 96 | 6M | 3.0 | |
| Com. Ex. 13 | 35 | 62 | 3 | 4500 | Bad | 24 | 10 | 5.0 | Sanding was possible after 1.5 hours |
| | | | | | | 48 | 8MD | 3.0 | |
| | | | | | | 96 | 8MD | 2.8 | |
| Com. Ex. 14 | 12 | 33 | 55 | 1200 | Good | 24 | 4M | 3.0 | Sanding was possible after 1.5 hours |
| | | | | | | 48 | 2M | 1.5 | |
| | | | | | | 96 | 1M | Not more than 1 | |

(Notes)
$^{(1)}$Viscosity of the obtained putty is measured by BH type rotation viscometer (6 rpm, rotor-No. 7).
$^{(2)}$Workability is estimated as follows:
Good: Coating operation is carried out smoothly.
Bad: Coating operation is not carried out smoothly.

From the results of Example 13 and Comparative Examples 9 to 14, it is obvious that the coating composition is excellent in all properties of blister resistance, adhesion property to metal and workability only when the amount of components (A), (B) and (C) are maintained within the ranges of 10 to 45 parts, 50 to 70 parts and 5 to 50 parts, respectively, in the total amount of the components (A), (B) and (C) being 100 parts. If one of three components (A), (B) and (C) is outside the above-mentioned ranges, the effect of the invention cannot be obtained.

What we claim is:

1. An unsaturated polyester resin coating composition comprising (A) 10 to 45 parts by weight of an air dryable unsaturated polyester resin comprising a condensation product of a polybasic acid, a polyhydric alcohol, at least one member selected from the group consisting of cyclopentadiene and dicyclopentadiene and an acyclic ether having allyl group and hydroxyl group, (B) 50 to 70 parts by weight of a filler and (C) 5 to 50 parts by weight of a vinyl monomer, the total amount of said components (A), (B) and (C) being 100 parts by weight; said unsaturated polyester resin (A) having (1) 10 to 50% of units of the at least one member selected from the group consisting of cyclopentadiene and dicyclopentadiene and (2) 2 to 40% of units of the acyclic ether having allyl group and hydroxyl group, said % being % by mole based on said polybasic acid.

2. The composition of claim 1, wherein the content of the component (1) is 20 to 40% by mole.

3. The composition of claim 1, wherein the content of the component (2) is 10 to 30% by mole.

4. The composition of claim 1, wherein said acyclic ether is a member selected from the group consisting of pentaerythritol triallyl ether, trimethylolpropane diallyl ether, glycerol monoallyl ether, trimethylolethane diallyl ether and glycerol diallyl ether.

* * * * *